April 23, 1929.   S. YAMAMOTO   1,710,284

APPARATUS FOR RECOVERING VOLATILE OILS FROM MIXED GAS

Filed May 18, 1926

Inventor
S. Yamamoto
By Attorney
Marks & Clerk
Attys

Patented Apr. 23, 1929.

1,710,284

UNITED STATES PATENT OFFICE.

SAKAO YAMAMOTO, OF TOKYO, JAPAN.

APPARATUS FOR RECOVERING VOLATILE OILS FROM MIXED GAS.

Application filed May 18, 1926, Serial No. 110,014, and in Japan March 23, 1926.

This invention relates to an improvement in or relating to an apparatus for collecting volatile oils adsorbed by an adsorber by passing mixed gas containing the oil vapours therethrough and recovering the activity of the adsorber. The object of the invention is to most easily drive off, to liquefy and to collect the adsorbed oil vapours from the adsorber, as well as to recover the activity of the adsorber perfectly up to that of the new product.

Figure 1:
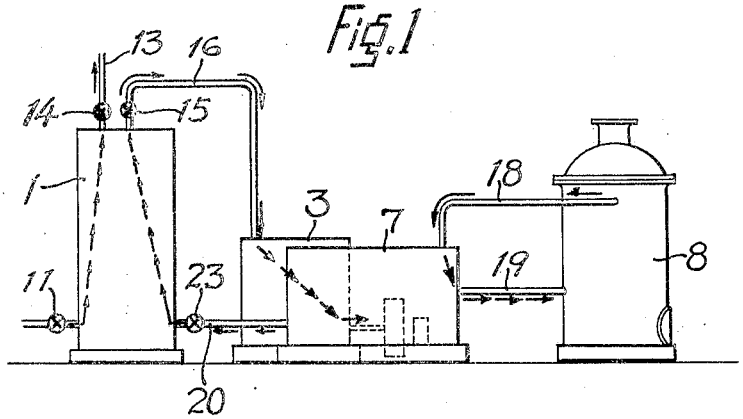
Figure 2:
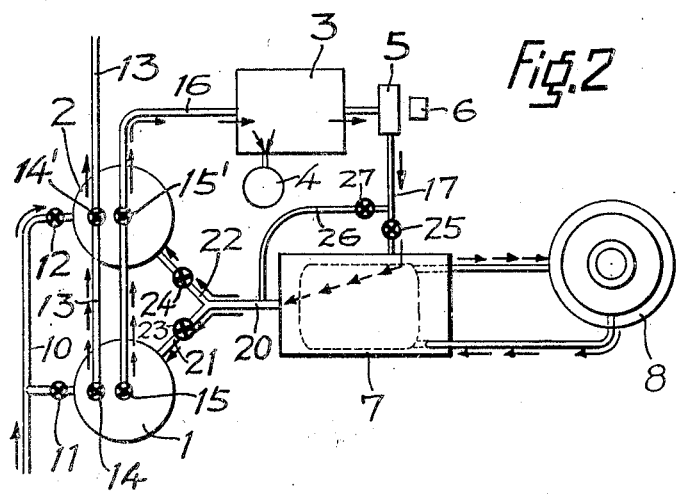

In the accompanying drawings,

Fig. 1 shows an elevation of one example of the apparatus according to the invention;
Fig. 2 shows a plan of the apparatus shown in Fig. 1.

In the drawings, 1 and 2 are adsorbing towers in which the so-called adsole, that is, an adsorptive material made from acidic clay such as Florida earth or fuller's earth according to the method described in the specification of U. S. application Serial No. 683,070, or any other proper adsorptive material made of mineral or other substances.
3 is a cooler of any convenient type such as a surface condenser. 4 is an oil receiver to collect the oil liquefied in the cooler. 5 is a fan driven by a motor 6. 7 is a heater of any convenient type the heating medium of which is supplied from a boiler 8. The heating medium may be any convenient fluid, but oil is recommended because the temperature of the heater can be raised thereby above 300° C. very easily.
The above described parts are connected by means of pipes and cocks as follows.

10 is a pipe to supply mixed gas, that is, the so-called permanent gases such as air or methan etc. containing vapour of one or more of volatile hydrocarbon oils which are naturally liquids under atmospheric condition. Such mixed gas may be for instance natural gases or coal gas etc. 11 and 12 are cocks provided in the pipe 10 to shut or open the supply of the mixed gas into the towers 1 and 2 respectively. 13 is a pipe through which the permanent gas supplied into the towers 1 and 2 and deprived of the oil vapour therein is exhausted. 14 and 14' are cocks provided in the pipe 13 to shut or open the escapement of the permanent gas passing through the towers. 16 is a pipe communicating the towers 1 and 2 to the cooler 3. 15 and 15' are cocks provided in the pipe 16 to open or close the communication between the towers and the cooler. 17 is a pipe communicating the cooler 3 and the heater 7 and is provided with a cock 25. 18 is a pipe for supplying a heating medium from the boiler 8 to the heater 7, while 19 is the return pipe of the medium. 20 is a pipe communicating the heater 7 to the towers 1 and 2 by its branch pipes 21 and 22, the pipes being provided with cocks 23 and 24 respectively. 26 is a bypass pipe communicating the pipes 17 and 20 directly and is provided with a cock 27.

In the working of the above described apparatus, it is assumed that the tower 1 is now subjected to the adsorbing operation while the tower 2 was already saturated with oil vapour and is now subjected to the recovering operation. In this state, the cocks 11 and 14 in the tower 1 are opened while the cocks 15 and 23 are closed. In the tower 2, the cocks 12 and 14' are closed while the cocks 15' and 24 are opened. Further, the cock 27 in the pipe 26 is closed and the cock 25 in the pipe 17 is opened. Here, when the fan 5 is driven, a current in a closed cycle including tower 2, cooler 3, fan 5, and heater 7 begins to flow and thereby the oil vapour, which was adsorbed by the adsole etc. is driven off by hot gas coming from the heater 7. This hot gas rich in oil vapour is cooled down in the cooler so that the vapour is condensed or liquefied and the oil thus produced is collected in the receiver 4. The permanent gas drawn by the fan from the cooler is again heated while passing through the heater 7 which again acts to drive off the oil vapour still remaining in the tower 2.

When such circulation of the heating medium in the closed cycle is continued until all the oil vapour adsorbed in the tower 2 is driven off and collected, the cock 25 is closed and cock 27 is opened so that the heater 7 is cut out of the cycle. Therefore, now the cycle including 2, 3, 5, but not including the heater 7 is started and the tower 2 is efficiently cooled by the cold gas. This gas contains no steam vapour and therefore does not lessen any adsorptive power of the adsorber packed in the tower 2, so that the active power thereof is entirely recovered. It can be very easily adjusted that the time necessary for the recovering operation, that is, for driving off the oil vapour in one tower from the adsorber and then cooling it as above stated is equal or rather shorter than that necessary for completing the adsorbing operation in the other. Therefore, after completing the recovering operation in one tower, when the adsorbing operation is completed, the cocks 11, 14, 15, 23 and cocks 12, 14', 15', 24 are reversely closed or opened so that in the tower 2 the adsorbing operation begins, while in the tower 1 now recovering operation begins.

It will be understood that by alternating these operations in the successive towers, a continuous working may be carried out without any trouble, although such alternating operation and accordingly number of absorbing towers is by no means the essential of the invention.

I claim:

1. An apparatus for collecting volatile oils adsorbed by an adsorber by passing mixed gas containing oil vapours therethrough and recovering the activity of the adsorber, comprising a closed cycle of one or more adsorbing towers, a cooler, a fan and a heater, a by-pass being provided to cut off the heater from the cycle, substantially as shown and described.

2. An apparatus for collecting volatile oils adsorbed by an adsorber by passing mixed gas containing oil vapour therethrough and recovering the activity of the adsorber, comprising a closed cycle of one or more adsorbing towers, a cooler, a fan, a heater, a by-pass to cut off the heater, and a boiler to supply the heating medium to the heater, substantially as shown and described.

In testimony whereof I affix my signature.

SAKAO YAMAMOTO.